Sept. 26, 1950 E. WEEKS ET AL 2,523,979
COLLAPSIBLE TIRE BEAD LOOSENING DEVICE
Filed April 5, 1946 2 Sheets-Sheet 1
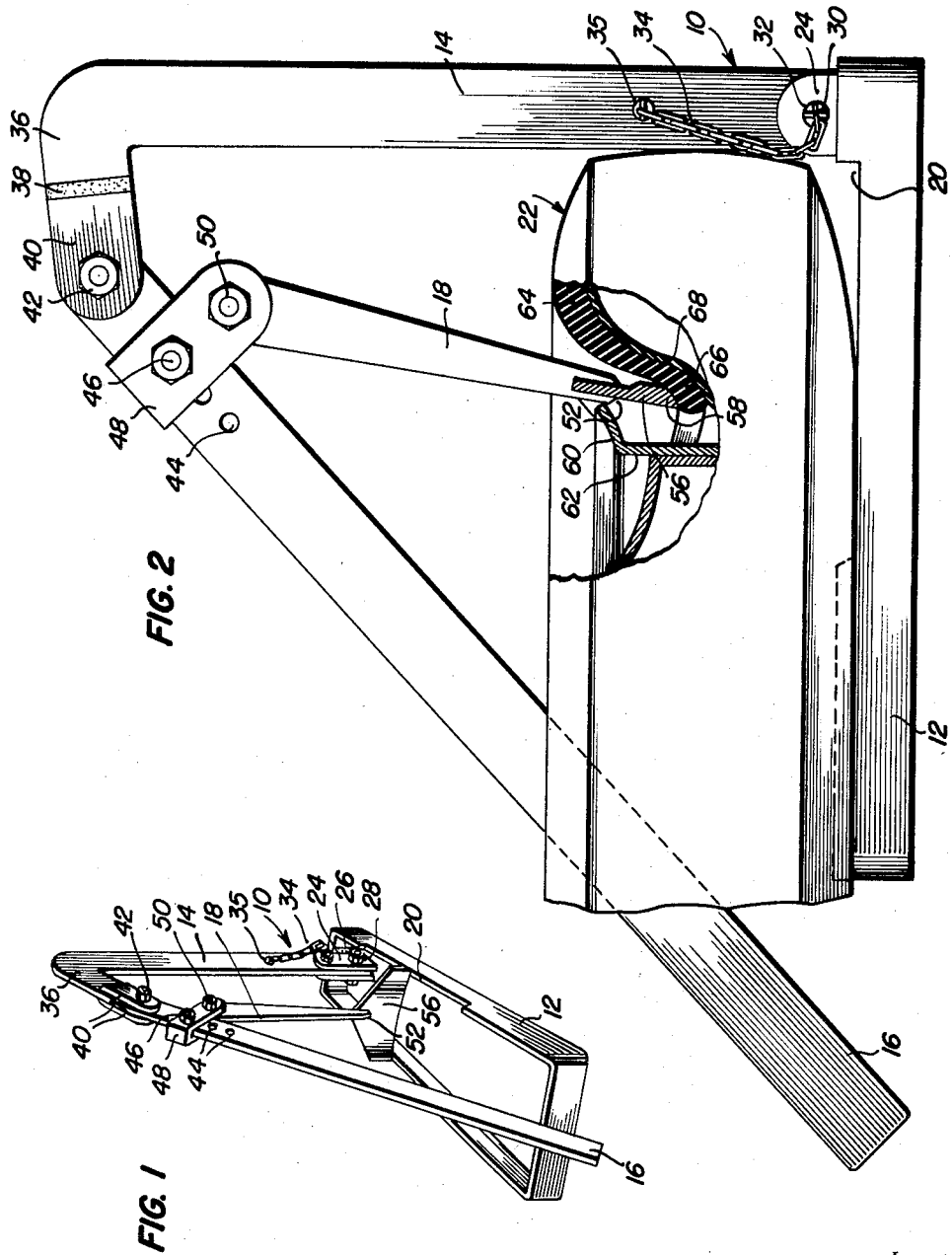
Inventor
**ELMER WEEKS
HERMAN WEEKS**
By *Clarence A. O'Brien
and Harvey B. Jacobson*
Attorneys

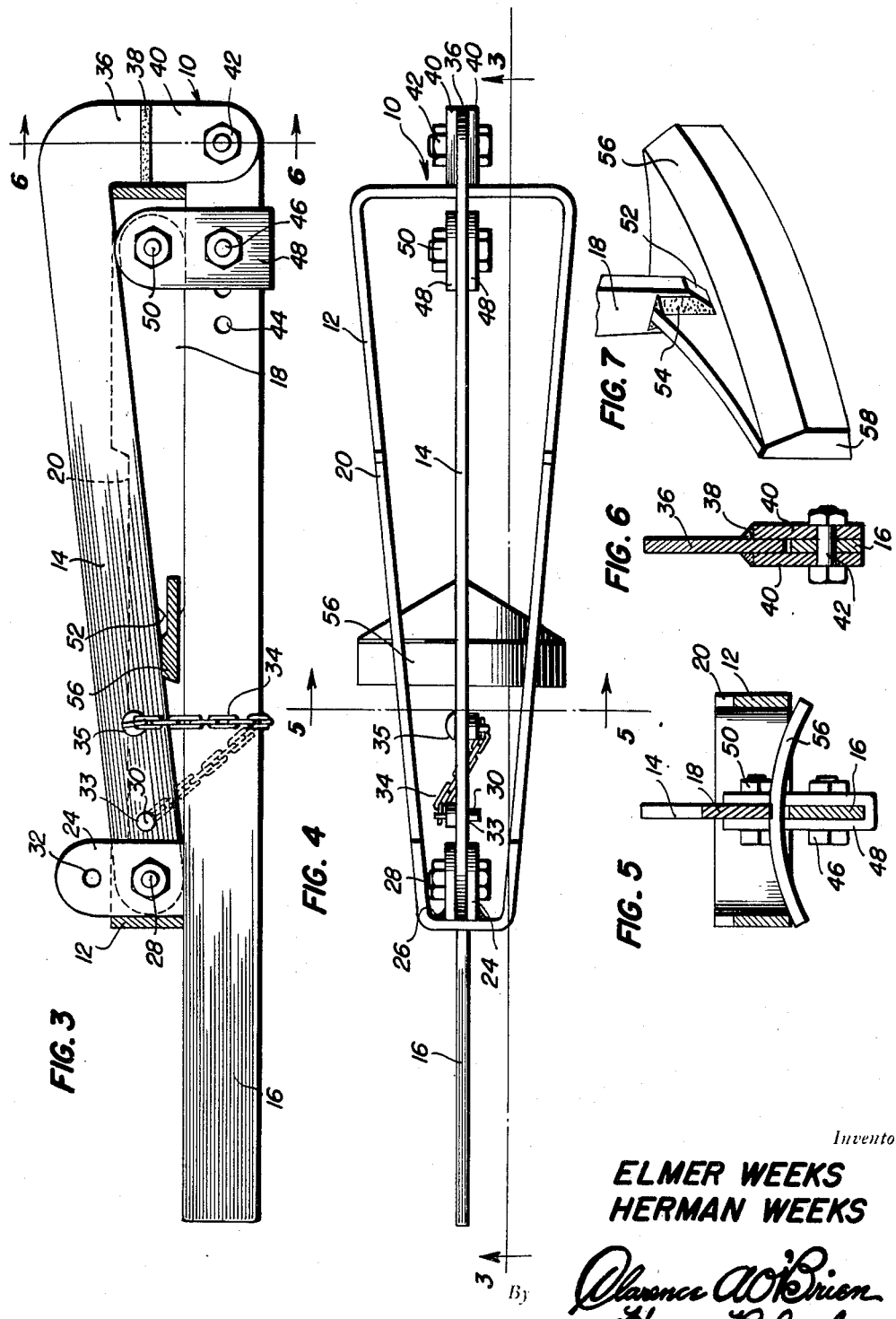

Patented Sept. 26, 1950

2,523,979

UNITED STATES PATENT OFFICE 2,523,979

COLLAPSIBLE TIRE BEAD LOOSENING DEVICE

Elmer Weeks and Herman Weeks, Scott Bar, Calif.

Application April 5, 1946, Serial No. 659,938

3 Claims. (Cl. 157—1.26)

This invention relates to a collapsible tire tool, and pertains more particularly to an implement for removing tires from a conventional drop center rim.

A primary object of the invention is the provision of a tool whose construction is adapted for expeditious folding into a compact and convenient bundle.

A further object of the invention is the provision of a tool in accordance with the above object and which shall have a minimum number of moving parts.

A still further object of the invention is the provision of a tool in accordance with each of the foregoing objects, and which is capable of immediate and easy erection for use in all situations.

An additional object of the invention is the provision of a tool in accordance with each of the foregoing objects, and wherein the parts of the tool are particularly designed for both their normal operative function and also for compact engagement in disassembly.

An additional object of the invention is the provision of a tool in accordance with each of the foregoing objects, and wherein the tool is capable of erection and collapse without requiring dismantling or any removal of parts other than engagement or disengagement of a single pin.

A still further object of the invention is the provision of a tool in accordance with each of the foregoing objects, wherein the tool is inherently adaptable to a variety of sizes of tires.

A still further object of the invention is the provision of a tool in accordance with each of the foregoing objects, wherein the same single means is utilized for retaining the tool in either its erected or collapsed condition.

A still further object of the invention is the provision of a tool in accordance with each of the foregoing objects, and wherein a tool is provided which is strong, durable, reliable in operation, of light weight and which shall be relatively inexpensive to manufacture.

These and other important objects which will become later apparent are attained by the device disclosed in the drawings, where:

Figure 1 is a perspective view of our invention in its erected position;

Figure 2 is a side elevational view of Figure 1, showing the device in operative engagement with a tire, parts being shown in section;

Figure 3 is a sectional view of the device in collapsed condition, being taken upon the section line 3—3 of Figure 4, looking in the direction of the arrows;

Figure 4 is a top plan view of the device in collapsed position;

Figure 5 is a transverse, sectional view on line 5—5 of Figure 4 and looking in the direction of the arrows;

Figure 6 is a transverse sectional view along line 6—6 of Figure 3, looking in the direction of the arrows; and Figure 7 is a perspective detail view of a portion of the blade of the tool.

With particular reference now to Figures 1–4 of the drawings, there is illustrated the tool, indicated generally at 10 and consisting of the base portion 12, standard 14, handle 16 and arm 18.

The base 12 comprises a generally rectangular, open frame of suitable construction and is provided with suitably positioned lateral recesses 20 for the reception of a rim and tire indicated generally at 22 in Figure 2, and at one end carries upon its inner surface a pair of spaced, upstanding lugs 24, secured thereto as by welding, indicated at 26. Journalled between lugs 24, as by a bolt 28 or other suitable fastening means, which may, if preferred, be of a permanent type, is the vertical standard 14, detachably secured in its erected position as by a pin 30, engaged in a bore 32 extending through both the lugs 24 and through bore 33 in standard 14. A chain 34 attached to the standard as at 35, provides means for securing the pin 30 against loss, and as set forth hereinafter, serves to fasten the tool in its collapsed condition.

At its upper end, standard 14 is provided with an inturned arm 36, to whose extremity is secured as by welding 38, a pair of plates 40, shown more clearly in Figure 6. The latter constitute bearing means for a bolt 42 or other suitable fulcrum for the handle 16. A series of spaced apertures 44 are provided in the handle adjacent the plates 40, to adjustably support, as by a bolt 46, a U-shaped hanger bracket 48, slidably received on handle 16, to which is pivotally secured at 50, a depending, oscillatable arm 18. The lower extremity of arm 18 terminates in a tapered portion 52 and carries in any suitable manner, as by welding 54, a blade 56 of arcuate shape, conforming generally to the curvature of a tire rim, and having a peripheral bevelled portion 58 at its lower end, as shown more clearly in Figure 7.

As indicated in Figure 2, a tire and rim 22 of conventional design, is receivable in the recess 20 and consists of a rim 60 having a drop center 62 and carries an outer tire casing 64 with bead 66 and inner tube 68.

Referring again to Figures 1 and 2, it will be noted that when the standard 14 is perpendicular to the base 12, in its erected position, the pin 30 is passed through the bores 32 and 33 locking the parts in the operative position. When, however, it is desired to fold the tool into collapsed position for carrying or storage, pin 30 is withdrawn, standard 14 is folded down upon one side of base 12, the arm 36 snugly receiving the edge of the base as shown in Figure 3 and the handle 16 is then folded over the other side of the base, whereupon the chain 34 is passed around the handle and the pin is inserted into bore 33. As shown in Figures 3 and 4, the chain and pin therefore secure the lever 16 to the standard 14; the base 12 and arm 18 being clamped between them, the length of the chain being chosen to compactly secure the parts in this position. It will be here noted that we so proportion the relative dimensions of the base 12, blade 56, arm 18, standard 14, arm 36, lugs 24, handle 16 and the chain 34 that the tool folds into a neat, convenient article.

Attention is here directed to our provision of a single disengageable means, the pin 30 and chain 34, for locking the tool selectively in either of its two positions.

From the foregoing, it is believed that the operation of the device will now be obvious. From the folded position of Figures 3 and 4, the tool is erected into the operative position of Figures 1 and 2, by first withrawing pin 30 from bore 33 in standard 14, unwinding chain 34, then pivoting the handle 16 to relieve its clamping engagement upon base 12 and arm 18, then rotating standard 14 into its perpendicular position relative to base 12 and locking it by inserting pin 30 through the aligned bores 32 and 33. This simple operation requires no fumbling with various parts, but can be readily performed under adverse weather conditions, and in the dark, as a single, steady, continuous pull will erect the device and the engagement of only one element, the pin 30, minimizes the manipulations required. A tire and rim are now placed in recess 20 and the bevelled edge 56 abutted against the bead 66 adjacent the flange 60. Downward pressure upon handle 16 causes the arm 18 and blade 56 to force the bead 66 downwardly from its engagement with rim 60. It will be observed that as the arm 18 is forced downwardly, the bevelled or inclined surface 52 thereon constitutes a cam or wedge forcing the blade 56 and the tire bead 66 outwardly from the rim, to more effectively free a rusted or frozen tire from the rim. It is of course apparent that the tire is successively placed in rotated position in the recess 20, and the foregoing process repeated as often as necessary until the tire is completely released from the rim. By pivoting the arm 18 in the proper hole 44, the blade 56 is properly positioned for manipulating tires of various sizes.

It is to be clearly understood, that we may avail ourselves of various equivalents as to materials and details of construction falling within the scope of the appended claims.

We claim as our invention:

1. A foldable and collapsible tire tool, comprising an elongated base having means to support a wheel and tire assembly in prone position thereon, a substantially L-shaped standard comprising a first leg and a second leg, a first pivot connecting the free end of the first leg to said base at one end thereof with the second leg extending over said base, a handle and a second pivot connecting the handle to the free end of said second leg, a tire engaging arm and a third pivot connecting the arm to the handle in depending relation thereto, releasable means for rigidly securing said standard in operative relation to said base, the dimension of said standard between the first pivot and the second leg being greater than the length of the base and the dimension of said second leg between the second pivot and first leg being greater than the vertical height of the base at the other end, whereby the standard and the handle may be rotated to a collapsed position relative to the base with the base clamped between the first leg and the handle, and said securing means also constituting means for retaining the tool in collapsed relation.

2. The combination of claim 1, wherein said tire engaging arm terminates in a rim engaging cam portion and in an arcuate, tire bead engaging blade.

3. The combination of claim 1, wherein said securing means comprises a pin secured to said first leg by a flexible member, said first leg and base having openings which register when the standard is in operative relation relative to the base, whereby the tool may be selectively retained in operative relation by the pin extending through said openings or in the collapsed position with the flexible member disposed about the handle with the pin received in the opening in said first leg.

ELMER WEEKS.
HERMAN WEEKS.

REFERENCES CITED

The following references are of record in the file of this patent:

UNITED STATES PATENTS

| Number | Name | Date |
| --- | --- | --- |
| D. 138,773 | Graves et al. | Sept. 12, 1944 |
| 819,156 | Morrill | May 1, 1906 |
| 1,217,009 | Kavanagh | Feb. 20, 1917 |
| 1,447,113 | Woodhall | Feb. 27, 1923 |
| 1,495,884 | Chapman | May 27, 1924 |
| 1,567,276 | Kowalzcyk et al. | Dec. 29, 1925 |
| 2,449,960 | Toles | Sept. 21, 1948 |
| 2,474,926 | York | July 5, 1949 |